(12) United States Patent
Niwa et al.

(10) Patent No.: US 9,444,100 B2
(45) Date of Patent: Sep. 13, 2016

(54) SECONDARY BATTERY (71) Applicant: KABUSHIKI KAISHA TOYOTA JIDOSHOKKI, Kariya-shi, Aichi (JP)

(72) Inventors: Junichi Niwa, Kariya (JP); Masataka Nakanishi, Kariya (JP); Kazuhito Kawasumi, Kariya (JP); Masakazu Murase, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 18 days.

(21) Appl. No.: 14/373,105

(22) PCT Filed: Sep. 21, 2012

(86) PCT No.: PCT/JP2012/006031
§ 371 (c)(1),
(2) Date: Jul. 18, 2014

(87) PCT Pub. No.: WO2013/108309
PCT Pub. Date: Jul. 25, 2013

(65) Prior Publication Data
US 2014/0356731 A1  Dec. 4, 2014

(30) Foreign Application Priority Data
Jan. 20, 2012  (JP) .................................. 2012-010137

(51) Int. Cl.
H01M 4/46 (2006.01)
H01M 4/38 (2006.01)
H01M 4/02 (2006.01)
H01M 10/36 (2010.01)
H01M 10/38 (2006.01)

(52) U.S. Cl.
CPC ................ *H01M 4/38* (2013.01); *H01M 4/02* (2013.01); *H01M 4/463* (2013.01); *H01M 4/466* (2013.01); *H01M 10/36* (2013.01); *H01M 10/38* (2013.01)

(58) Field of Classification Search
CPC ........ H01M 4/38; H01M 4/381; H01M 4/40; H01M 4/46; H01M 4/463; H01M 4/466; H01M 4/134
See application file for complete search history.

(56) References Cited

U.S. PATENT DOCUMENTS

| 4,063,005 | A  | * | 12/1977 | Mamantov et al. | 429/103 |
| 4,220,695 | A  | * | 9/1980  | Ishida et al.   | 429/172 |
| 4,427,747 | A  | * | 1/1984  | Bennett et al.  | 429/50  |
| 4,968,393 | A  |   | 11/1990 | Mazur et al.    |         |
| 2002/0068222 | A1 | * | 6/2002  | Ishii et al.  | 429/347 |
| 2006/0088763 | A1 |   | 4/2006  | Li et al.     |         |
| 2009/0068568 | A1 |   | 3/2009  | Yamamoto et al. |       |
| 2009/0205851 | A1 | * | 8/2009  | Satoh et al.  | 174/250 |
| 2010/0203439 | A1 | * | 8/2010  | Zhou et al.   | 430/108.6 |
| 2010/0297537 | A1 | * | 11/2010 | Coors et al.  | 429/532 |
| 2011/0104526 | A1 | * | 5/2011  | Boxley et al. | 429/50  |
| 2012/0082904 | A1 | * | 4/2012  | Brown et al.  | 429/338 |
| 2012/0164499 | A1 | * | 6/2012  | Chiang et al. | 429/81  |
| 2013/0108919 | A1 | * | 5/2013  | Matsui        | 429/188 |

FOREIGN PATENT DOCUMENTS

| CN | 101765939 A | 6/2010 |
| CN | 102082263 A | 6/2011 |
| JP | 52-17209 B | 5/1977 |
| JP | 2008-293678 A | 12/2008 |
| JP | 2009-64730 A | 3/2009 |
| JP | 2009-230899 A | 10/2009 |
| JP | 2010-15782 A | 1/2010 |
| JP | 2011-81971 A | 4/2011 |
| JP | 2011-228219 A | 11/2011 |
| WO | 2008/133642 A2 | 11/2008 |
| WO | 2010/073978 A1 | 7/2010 |
| WO | 2011/057135 A2 | 5/2011 |

OTHER PUBLICATIONS

Communication dated Jun. 16, 2015 from the Japanese Patent Office in counterpart application No. 2013-554083.
Office Action dated Oct. 10, 2015 from the Chinese Patent Office in Application No. 201280067381.4.
Communication dated Feb. 4, 2016, from the Japanese Patent Office in application No. 2013-554083, which is the national phase of PCT/JP2012/006031 in Japan.

* cited by examiner

Primary Examiner — Anca Eoff
(74) Attorney, Agent, or Firm — Sughrue Mion, PLLC (57) ABSTRACT

In a secondary battery, a negative electrode, an electrolytic solution for negative electrode, a diaphragm, an electrolytic solution for positive electrode, and a positive electrode are disposed in order. The negative electrode includes a negative-electrode active material that has an element whose oxidation-reduction potential is more "base" by 1.5 V or more than an oxidation-reduction potential of hydrogen, and whose volume density is larger than that of lithium metal. The diaphragm includes a solid electrolyte transmitting ions of said element alone. A secondary battery with high volumetric density is provided.

11 Claims, 4 Drawing Sheets

SECONDARY BATTERY

TECHNICAL FIELD

The present invention relates to a secondary battery.

BACKGROUND ART

Recently, lithium-ion secondary batteries have been used in a wide range of areas, such as cellular phones and notebook-size personal computers, because they have large capacities. Moreover, in recent years, lithium-ion secondary batteries have been also investigated to use as a driving source for vehicle. A positive electrode of a lithium-ion secondary battery comprises ceramics, such as lithium composite oxides, and lithium ions come in and out between ceramic layers at the time of charging and discharging. A negative electrode comprises carbon, and the lithium ions come in and out between carbon layers at the time of charging and discharging. Thus, sorbing and desorbing (or occluding and releasing) of the lithium ions are repeated at the positive electrode and negative electrode, and thereby electric energy is produced.

Lately, as disclosed in WO2010/073978 (i.e., Patent Application Publication No. 1), a lithium battery which uses lithium metal for a negative electrode and metallic copper for a positive electrode has been developed. In this lithium battery, lithium metal is plated onto the surface of the negative electrode while copper is dissolved at the positive electrode at the time of charging; whereas the metallic copper is plated onto the surface of the positive electrode while lithium is dissolved at the negative electrode at the time of discharging. Such battery reactions resulting from precipitation and dissolution of plating are simple compared with the battery reactions of common lithium-ion secondary battery. Hence, upgrading the output of battery can be expected. Moreover, since the electrodes are metals, the conductivities of the electrodes themselves are good. Consequently, the metals are available for electrodes as they are without using any current collector.

RELATED ART

SUMMARY OF THE INVENTION

Problems to be Solved by the Invention

Currently, metallic materials used for negative electrode have been limited to lithium metal. When the oxidation-reduction potential of hydrogen is taken as 0 (zero), the oxidation-reduction potential of lithium metal is −3V, and accordingly the potential is more "base" compared with that of other metals. Consequently, using lithium metal for negative electrode leads to enlarging the electromotive force of battery.

The battery capacity per unit mass of lithium metal is 3,860 mAh/g, and is large relatively. However, the volume density of lithium metal is 0.5 g/cm$^3$, and the volume density is low considerably. Consequently, the resulting volumetric energy density has become lower.

The present invention is made in view of such circumstances. The object of the invention is to provide a secondary battery with high volumetric energy density.

Means for Solving the Object

A secondary battery according to the present invention comprises a negative electrode, an electrolytic solution for negative electrode, a diaphragm, an electrolytic solution for positive electrode, and a positive electrode, which are disposed in order, and is characterized in that said negative electrode comprises a negative-electrode material which has an element, wherein an oxidation-reduction potential of said element that is more "base" by 1.5 V or more with respect to an oxidation-reduction potential of hydrogen, and wherein a volume density of said material is larger than that of lithium metal, said diaphragm comprises a solid electrolyte which transmits ions of said element alone.

Advantages of the Invention

In the present invention, a negative-electrode material has an element whose oxidation-reduction potential is more "base" by 1.5 V or more than an oxidation-reduction potential of hydrogen. Consequently, a secondary battery with high volumetric energy density is obtainable.

DETAILED DESCRIPTION OF THE PREFERRED EMBODIMENTS

The following describes secondary batteries according to embodiments of the present invention.

In a secondary battery, a negative electrode, an electrolytic solution for negative electrode, a diaphragm, an electrolytic solution for positive electrode, and a positive electrode are disposed in this order. For the negative electrode, an element having a more "base" potential, namely, a negative potential, is commonly used when an oxidation-reduction potential of hydrogen is taken as 0 (zero). In the present invention, the negative electrode comprises a negative-electrode material having an element whose oxidation-reduction potential is more "base" by 1.5 V or more than an oxidation-reduction potential of hydrogen. An oxidation-reduction potential of the element included in the negative-electrode material is more "base" than an oxidation-reduction potential of hydrogen, namely, less than −1.5 V or more. The negative-electrode material whose oxidation-reduction potential is more "base" by 1.5 V or more than an oxidation-reduction potential of hydrogen is preferable.

The negative-electrode material itself functions as an active material that bears battery reactions. In the present invention, an oxidation-reduction potential of lithium metal is −3 V with respect to an oxidation-reduction potential of hydrogen, and accordingly the oxidation-reduction potential of the element being composed of the negative-electrode material is similar to the oxidation-reduction potential of lithium metal relatively. Consequently, an electromotive force of the battery is enlarged. Moreover, a volume density of the negative-electrode material is larger than that of lithium metal. Consequently, the battery capacity per unit volume becomes larger, so that a volumetric energy density of the battery is enlarged.

A preferable element included in the negative-electrode material is that a potential of the element is not more "noble" by 1.5 V (i.e., within +1.5 V) with respect to the potential of lithium, −3.045 V. Thus, the potential of the element is near to that of lithium relatively, so that an electromotive force is enlarged. Since lithium has a small volume density, a volumetric energy density of lithium is small. Consequently, a preferable element included in the negative-electrode material is an element other than lithium.

When the element included in the negative-electrode material has turned into an ionic substance, the larger valence the ionic substance has, the larger the capacity of resulting batteries is. Consequently, although a monovalent valence of the ionic substance is acceptable, a divalent, trivalent, or more than trivalent valence is preferable.

Battery reactions of a secondary battery according to the present invention will be explained. A case where the positive electrode is metallic copper and the negative electrode is aluminum will be exemplified. At the time of charging the secondary battery, such a reaction as Cu - - - >$Cu^{2+}$+2e$^-$ occurs at the positive electrode. The $Cu^{2+}$ is released into the electrolytic solution on the side of the positive electrode. $Al^{3+}$, which exists in the electrolytic solution on the side of the positive electrode, transmits through the diaphragm, and then moves into the electrolytic solution on the side of the negative electrode. The electron, e$^-$, which has generated at the positive electrode, transmits through a wiring circuit that connects between the positive electrode and the negative electrode, and then moves to the negative electrode. At the negative electrode, such a reaction as $Al^{3+}$+3e$^-$ - - - >Al occurs.

At the time of discharging, such a reaction as Al - - - >$Al^{3+}$+3e$^-$ occurs at the negative electrode, and then the $Al^{3+}$ is released into the electrolytic solution on the side of the negative electrode. The $Al^{3+}$ transmits through the diaphragm, and then moves into the electrolytic solution on the side of the positive electrode. The electron, e$^-$, which has generated at the negative electrode, transmits through the wiring circuit, and then moves to the positive electrode. $Cu^{2+}$ in the electrolytic solution on the side of the positive electrode is served, along with the electrons, for such a reaction as $Cu^{2+}$+2e$^-$ - - - >Cu at the positive electrode.

Note herein that the diaphragm comprises a solid electrolyte that transmits ions of the element alone that constitutes the negative electrode. Thus, the electrolytic solution on the side of the negative electrode, and the electrolytic solution on the side of the positive electrode come to be separated while being interposed by the diaphragm. Consequently, the electrolytic solution on the side of the negative electrode, and the electrolytic solution on the side of the positive electrode have different components from one another. Hence, the negative-electrode-side electrolytic solution and positive-electrode-side electrolytic solution are made to have components that are suitable for the respective charging and discharging reactions on the negative-electrode side and positive-electrode side. Consequently, the output of the battery is upgraded. Moreover, the degree of freedom increases in combining an element constituting the positive electrode with another element constituting the negative electrode, so that various secondary batteries are manufactured.

A preferable negative-electrode material comprises a metal having a metallic element that is more "base" by 1.5 V or more than an oxidation-reduction potential of hydrogen, or an alloy including the metallic element. A preferable element constituting the negative electrode is such a metallic element, and a preferable negative-electrode material comprises a metal including said metallic element, or an alloy including said metallic element. In the above case, the metal or alloy precipitates and dissolves on the respective surfaces of the negative electrode and positive electrode. Consequently, cyclic characteristics degradations which result from the destructions of active materials are prevented. Since the metallic element itself has high conductivity, the element functions as a current collector. When the negative-electrode material comprises the metallic element, arranging a current collector is not needed separately or specially, so that a negative electrode is composed of the negative-electrode material itself. An allowable negative-electrode material is a metallic material comprising the metallic element. In this instance, a negative electrode is also composed of the negative-electrode material alone. Moreover, the negative-electrode material is also used as an active material, and the negative-electrode material is then placed onto the surface of a current collector separately or specially.

Figure 1:
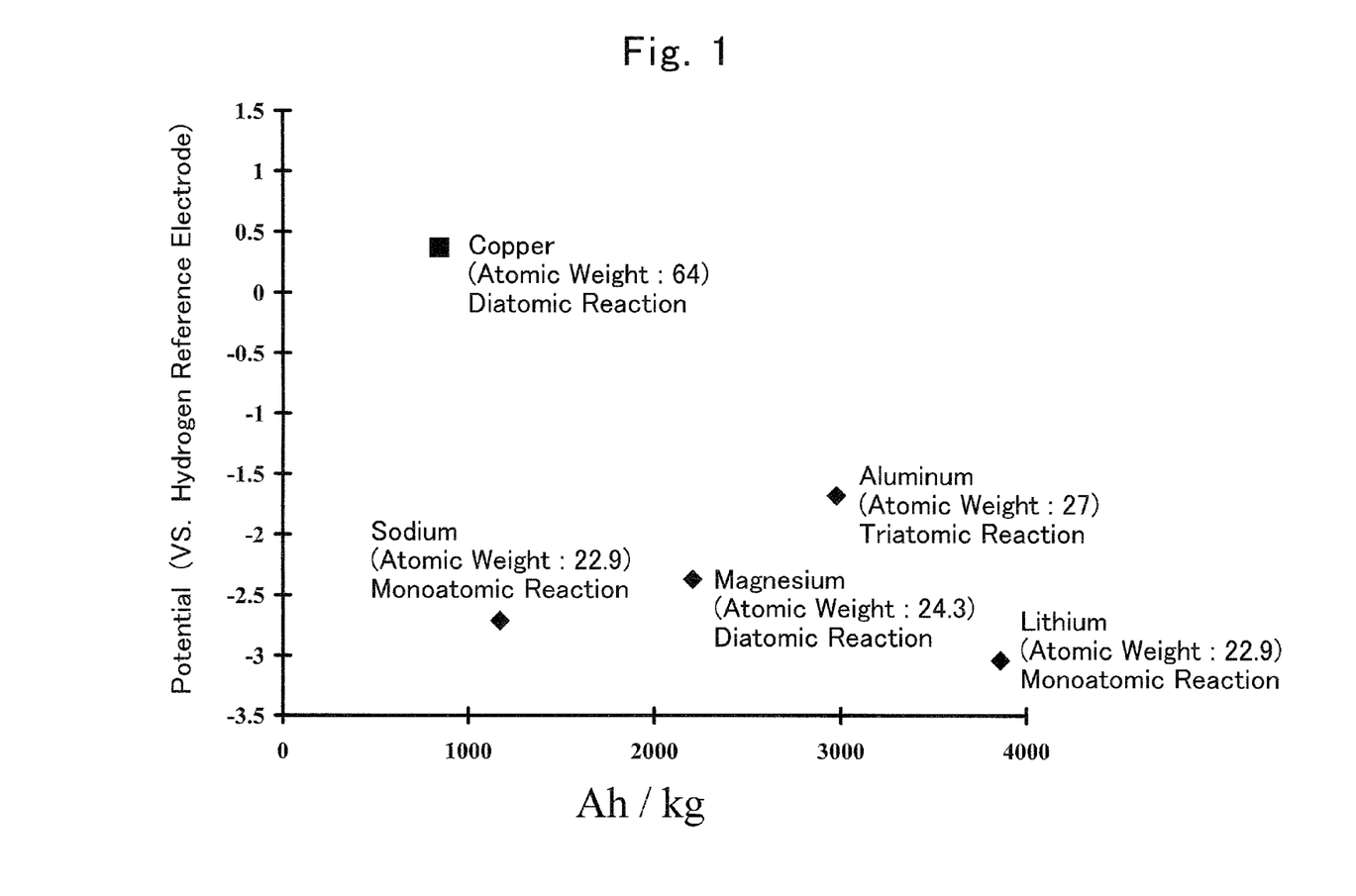
FIG. 1 is a diagram of a potential versus a battery capacity per unit mass with regard to various kinds of electrode materials.
Figure 2:
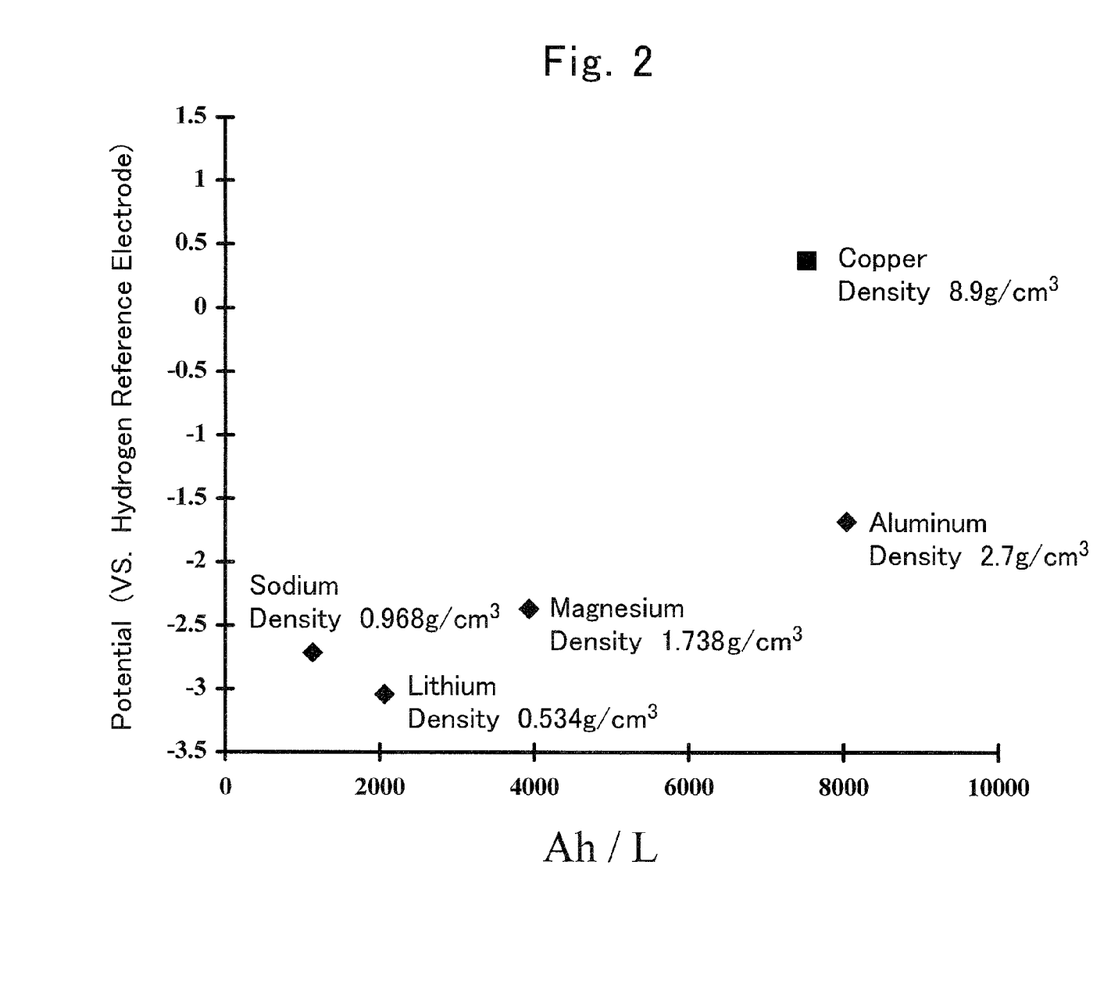
FIG. 2 is a diagram of a potential versus a battery capacity per unit volume with regard to various kinds of electrode materials, and the potential thereof.

As for a metallic element to be used for the negative-electrode active material, sodium (Na), magnesium (Mg), calcium (Ca), aluminum (Al), potassium (K), strontium (Sr), or barium (Ba), and the like, are available. The oxidation-reduction potential of the metallic elements is as follows: −2.714 V for Na; −2.363 V for Mg; −2.87 V for Ca, −1.68 V for Al; −2.925 V for K; −2.89 V for Sr; and −2.92 V for Ba, with reference to that of hydrogen. The electric properties of sodium, magnesium, calcium and aluminum are enumerated in Table 1, along with that of lithium. Moreover, FIG. 1 shows an oxidation-reduction potential when an oxidation-reduction potential of hydrogen is taken as zero versus a battery capacity per unit mass with regard to sodium, magnesium, aluminum and copper. FIG. 2 shows an oxidation-reduction potential when an oxidation-reduction potential of hydrogen is taken as zero versus a battery capacity per unit volume with regard to sodium, magnesium, aluminum and copper.

TABLE 1

| Negative Electrode | Lithium | Sodium | Magnesium | Calcium | Aluminum |
| --- | --- | --- | --- | --- | --- |
| Potential (vs. NHE) | −3.045 | −2.714 | −2.363 | −2.87 | −1.68 |
| Potential (vs. Li/Li$^+$) | 0 | 0.331 | 0.682 | 0.175 | 1.365 |
| Number of Reaction Electrons | 1 | 1 | 2 | 2 | 3 |
| Atomic Weight | 6.941 | 22.9 | 24.3 | 40.0 | 27.0 |

TABLE 1-continued

| Negative Electrode | Lithium | Sodium | Magnesium | Calcium | Aluminum |
|---|---|---|---|---|---|
| Battery Capacity (mAh/g) | 3860 | 1170 | 2205 | 1339 | 2997 |
| Density (g/cm$^3$) | 0.534 | 0.968 | 1.783 | 1.55 | 2.7 |
| Battery Capacity (mAh/cm$^3$) | 2061 | 1132 | 3931 | 2075 | 8038 |

"NHE" stands for "when hydrogen's potential is taken as zero."
"Li/Li$^+$" stands for "when lithium's potential is taken as zero."
"Battery Capacity (mAh/cm$^3$) = "Battery Capacity (mAh/g)" × "Density (g/cm$^3$)"

As shown in Table 1, FIG. 1 and FIG. 2, the volume density of any one of sodium, magnesium, calcium, and aluminum is larger than that of lithium. Moreover, although the potentials of these metals are not so "base" as that of lithium, any one of them is more "base" by 1.5 V or more than an oxidation-reduction potential of hydrogen. Consequently, batteries which use these metals as the negative electrode have a large volumetric energy density, and demonstrate a large electromotive force.

When the negative-electrode material comprises sodium, magnesium, calcium or aluminum, and when the constituent elements are a metal which does not undergo any alloying reaction with negative-electrode ions, such as nickel, for instance, these constituent elements are employable as a current collector. Accordingly, the negative-electrode material is formed onto the surface of substrate. In this instance, a nickel substrate functions as a current collector.

A preferable volume density of the negative-electrode material is larger than the volume density of lithium metal. In the above case, the volumetric energy density is more enlarged. Note herein that the "volume density" refers to a mass per unit volume.

As for the electrolytic solution for negative electrode, any of organic electrolytic liquids, water-soluble electrolytic solutions, and electrolytic solutions of ionic liquids is employable. Which of the electrolytic solutions is used depends on types of the negative-electrode material. When the negative-electrode material comprises an alloy or metal that comprises magnesium, calcium or aluminum, for instance, an organic electrolytic solution, or an ionic liquid is suitable for the electrolytic solution for negative electrode. The "organic electrolytic solution" refers to an electrolytic solution that comprises an electrolyte and an organic solvent. The "ionic liquid" means a liquid that has an ionic substance.

As for the positive electrode, a positive-electrode material comprising an element whose potential is more "noble" than that of the element that is used in the negative-electrode material. A metal or alloy having a metallic element is preferable as the positive-electrode material. The positive-electrode material is a metallic material that comprises the metal or alloy. In this instance, the positive electrode is composed of the positive-electrode material alone. Moreover, the positive-electrode material is also used as an active material, and the positive-electrode material is then placed onto the surface of a current collector separately or specially. As for the metallic element to be used for the positive-electrode material, the following are given, for instance: copper, iron, nickel, silver or gold, and the like. From the viewpoint of stability and larger capacity, metallic copper is preferable as a positive-electrode material. A standard oxidation-reduction potential of copper (Cu), iron (Fe), nickel (Ni), silver (Ag) and gold (Au) is as follows: 0.337 V for Cu/Cu$^{2+}$; −0.44 V for Fe/Fe$^{2+}$; −0.257 V for Ni/Ni$^{2+}$; 0.799 V for Ag/Ag$^+$; and 1.83 V for Au/Au$^+$, with reference to that of hydrogen.

Moreover, an allowable positive-electrode material comprises at least one member selected from the group consisting of metallic oxides, metallic hydroxides, and metallic perhydroxides. For example, a positive electrode for nickel hydride, such as Ni(OH)$_2$, is also applicable. The oxidation-reduction reaction of Ni(OH)$_2$ is as follows: Ni(OH)$_2$+ OH$^-$ - - - >NiOOH+H$_2$O, and its standard oxidation-reduction potential is 0.48 V with reference to that of hydrogen.

A preferable positive electrode comprises the positive-electrode material having an element whose oxidation-reduction potential is more "noble" by 1 V or more than an oxidation-reduction potential of the negative-electrode material. An oxidation-reduction potential of an allowable positive-electrode material is more "noble" by 1 V or more than an oxidation-reduction potential of the negative-electrode material. That is, a permissible positive-electrode material is a material whose potential difference is more "noble" than an oxidation-reduction potential of the negative-electrode material by 1 V or more (or by +1 V or more). In the above case, a secondary battery with high capacity is made.

Any one of the positive-electrode materials comprising Cu, Fe, Ni, Ag, Au or Ni(OH)$_2$ has a potential difference that is more "noble" by 1 V or more than an oxidation-reduction potential of the negative-electrode material comprising Na, Mg, Ca, Al, K, Sr or Ba, so that any of the combinations is employable as the secondary battery according to the present invention. For example, when the negative-electrode active material is aluminum, an allowable positive-electrode material includes an element that is more "noble" than iron. When the negative-electrode material is magnesium, a permissible positive-electrode material includes an element that is more "noble" than iron. As for the element that is more "noble" than iron, the following are given, for instance: Cu, Ni, Ag, Au or Ni(OH)$_2$. When the negative-electrode material is calcium, an allowable positive-electrode material includes an element that is more "noble" than magnesium. As for the element that is more "noble" than magnesium, the following are given, for instance: Al, Cu, Ni, Ag, Au or Ni(OH)$_2$. Note that, since a permissible positive-electrode material is a material whose potential difference is more "noble" than an oxidation-reduction potential of the negative-electrode material by 1 V or more, a feasible positive-electrode material is selected arbitrarily depending on its relative potential difference to that of the negative-electrode material.

As for an electrolyte to be contained in the water-soluble electrolytic solution for positive electrode, an allowable electrolyte is one of the following; electrolytes that undergo ion exchange with ions of an element, of which the positive-electrode material is composed, to generate ions of another element, of which the negative-electrode material is composed, within the electrolytic solution. As for such an electrolyte, the following are given, for instance: nitrates, chlorides or sulfates, and the like, including the ions of the element of which the negative-electrode material is com- posed. Although one of these electrolytes is also employed independently, the electrodes are even combined to employ.

The diaphragm comprises a solid electrolyte that transmits ions of the element constituting the negative-electrode material alone. This solid electrolyte does not transmit any element included in the positive-electrode material. For example, the following are given: "NASICON"- or $\beta$-Fe$_2$(SO$_4$)-type ion conductors, and polymer-type ion conductors, and the like. This solid electrolyte can be selected in compliance with types of the element constituting the negative-electrode material. In general, "NASICON (or Na Super Ionic Conductor)" represents a solid conductor that is expressed by Na$_3$Zr$_2$Si$_2$PO$_{12}$. In the present application, an "NASICON"-type structure is referred to as structures which belong to the same crystalline system as that of "NASICON"; namely, it is referred to as systems which are expressed by a general formula, A$_a$M$_2$ (XO$_4$)$_3$ (where "a"=1 through 3, and "A," "M" and "X" will be described later), and in which the MO$_6$ octahedrons and XO$_4$ tetrahedrons share the vertexes one another to constitute a three-dimensional network.

(A Case where Metallic Element Used for Negative-Electrode Material is Aluminum)

In a case where the metallic element used for the negative-electrode material is aluminum, an allowable negative-electrode material comprises an aluminum metal, or an aluminum alloy. A permissible diaphragm comprises a solid electrolyte that transmits aluminum ions alone. A preferable solid electrolyte comprises at least one member selected from the group consisting of "NASICON"-type aluminum conductors, $\beta$-Fe$_2$(SO$_4$)-type aluminum-ion conductors, and polymer-type aluminum-ion conductors. Moreover, as for the electrolytic solution for negative electrode, an ionic liquid that is represented by ethylmethylimidazolium salts is used suitably. In this instance, it is not needed necessarily to use an ionic liquid after dissolving it in an organic solvent. As for an ethylmethylimidazolium salt, a compound that is illustrated in (Chemical Formula 1) is available.

(Chemical Formula 1)

(A Case where Metallic Element Used for Negative-Electrode Material is Magnesium)

In a case where the metallic element used for the negative-electrode material is magnesium, an allowable negative-electrode material comprises a magnesium metal, or a magnesium alloy. A permissible diaphragm comprises a solid electrolyte that transmits magnesium ions alone. In this instance, an acceptable diaphragm comprises at least one member selected from the group consisting of $\beta$-Fe$_2$(SO$_4$)-type magnesium-ion conductors, polymer-type magnesium-ion conductors, and "NASICON"-type magnesium conductors.

An allowable electrolytic solution for negative electrode includes a Grignard reagent, RMgX (where "R" is an alkyl group, or an aryl group, and "X" is chlorine, boron, or iodine). In addition, in the electrolytic solution for negative electrode, the Grignard reagent, and another type of metallic ions are dissolved preferably in an organic solvent.

In a case where the metallic element used for the negative-electrode material is magnesium, an allowable organic solvent includes at least one species of organic compounds that have an ether bond, such as tetrahydrofuran (or THF) and diglyme; or at least one species of other organic compounds that have a sulfide bond or amide bond, such as tetrafluorothiophene (or THT). These solvents do not form any passivation film at all upon the dissolution and precipitation of magnesium that result from electrode reactions. Moreover, the solvents form coordinate bonds with magnesium ions, so that the magnesium ions are dissolved fully into the solvents.

A Grignard reagent forms a binuclear complex that comprises a dimer of the Grignard compounds. The binuclear complex loses "R$^-$" by means of reactions with another type of metallic ions. Thus, two magnesium ions are connected one another byway of a halogen element, so that the magnesium ions are altered to another binuclear complex in which a molecule of the organic solvent, or halogen atom, is connected to the respective magnesium ions. Since this binuclear complex has charge, high conductivity is given to the electrolytic solution. Moreover, since "R$^-$" is got rid of, the binuclear complex is less susceptible to oxidations, and thereby an oxidation potential of the electrolytic solution is kept high.

(A Case where Metallic Element Used for Negative-Electrode Material is Calcium)

In a case where the metallic element used for the negative-electrode material is calcium, an allowable negative-electrode material comprises a calcium metal, or a calcium alloy. A permissible diaphragm comprises a solid electrolyte that transmits calcium ions alone. An allowable solid electrolyte comprises at least one member selected from the group consisting of $\beta$-Fe$_2$(SO$_4$)-type calcium-ion conductors, "NASICON"-type calcium-ion conductors, and polymer-type calcium-ion conductors. A permissible electrolytic solution includes Ca(ClO$_4$)$_2$ as an electrolyte. As for an organic solvent included in the electrolytic solution, organic solvents having been heretofore known conventionally are available. For example, the following are given: propylene carbonate, tetrahydrofuran, dimethylsulfoxide, $\gamma$-butyrolactone, 1,3-dioxsolane, 4-methyl-1,3-dioxsolane, 1,2-dimethoxyethane, 2-methyltetrahydrofuran, sulfolane, diethyl carbonate, dimethylformamide, acetonitrile, dimethyl carbonate, and ethylene carbonate. Although one of these organic solvents is also employed independently, the organic solvents are even combined to employ.

(A Case where Metallic Element Used for Negative-Electrode Material is Sodium)

In a case where the metallic element used for the negative-electrode material is sodium, an allowable negative-electrode material comprises a sodium metal, or a sodium alloy. A permissible diaphragm comprises a solid electrolyte that transmits sodium ions alone. An allowable solid electrolyte comprises at least one member selected from the group consisting of "NASICON," $\beta$-Fe$_2$(SO$_4$)-type sodium-ion conductors, and polymer-type sodium-ion conductors. A permissible electrolytic solution includes NaClO$_4$ as an electrolyte. As for an organic solvent included in the electrolytic solution, organic solvents having been heretofore known conventionally are available. Moreover, the same organic solvents are used as those in the above-mentioned case where the metallic element used for the negative-electrode material is calcium. That is, as for an organic solvent included in the electrolytic solution, organic solvents having been heretofore known conventionally are available. For example, the following are given: propylene carbonate, tetrahydrofuran, dimethylsulfoxide, γ-butyrolactone, 1,3-dioxsolane, 4-methyl-1,3-dioxsolane, 1,2-dimethoxyethane, 2-methyltetrahydrofuran, sulfolane, diethyl carbonate, dimethylformamide, acetonitrile, dimethyl carbonate, and ethylene carbonate. Although one of these organic solvents is also employed independently, the organic solvents are even combined to employ. Of these, ethylene carbonate, and diethyl carbonate are used preferably.

In the secondary battery, the positive electrode, the electrolytic solution for positive electrode, the diaphragm, the electrolytic solution for negative electrode, and the negative electrode are arranged in order, for example, and then the constituent members are accommodated within a case. The secondary battery's configuration is not limited especially at all, so that a variety of configurations, such as cylindrical types, stack-layered types, coin types or laminated types, are adopted.

An allowable vehicle has a secondary battery on-board. Driving a motor for traveling with the above-mentioned secondary battery results in enabling the motor to exhibit large capacities and produce high outputs. A vehicle which makes use of electric energies based on the secondary battery for all or some of the power source is acceptable, so electric vehicles, hybrid vehicles, and so on, are available, for instance. When a vehicle has the secondary battery on-board, the secondary battery is connected preferably in a quantity of multiple pieces in series to make an assembled battery. Other than the vehicles, the secondary battery is likewise applicable to all sorts of products given as follows: household electrical appliances, office instruments or industrial instruments, which are driven with batteries, such as personal computers or portable communication devices, and so forth.

EMBODIMENTS

First Embodiment

Figure 3:
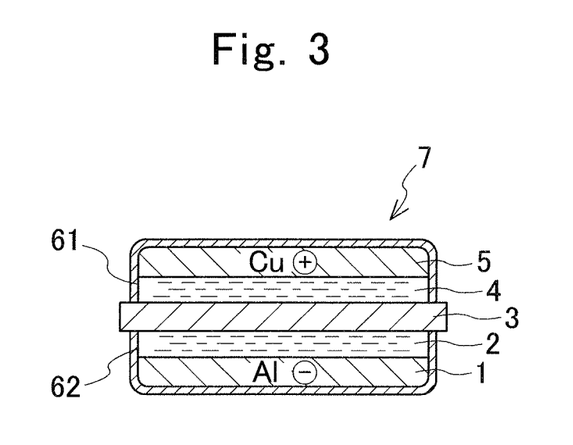
FIG. 3 is a cross-sectional explanatory diagram of a secondary battery according to a first embodiment of the present invention.

As illustrated in FIG. 3, a secondary battery 7 according to the present embodiment comprised a negative electrode 1, an electrolytic solution 2 for negative electrode, a diaphragm 3, an electrolytic solution 4 for positive electrode, and a positive electrode 5. The (negative electrode 1 comprised plate-shaped metallic aluminum. The electrolytic solution 2 for negative electrode was an organic electrolytic solution, and comprised the aforementioned ethylmethylimidazolium salt illustrated in (Chemical Formula 1).

The diaphragm 3 took on a membrane-like configuration with 0.15 mm in thickness. The diaphragm 3 was a solid electrolyte that transmitted aluminum ions alone, and a polymer-type aluminum-ion solid conductor was used therefor in the present embodiment. A specific construction of the polymer-type aluminum-ion conductor was a construction which was formed as follows: a mixture of polyethylene oxide and $Al_e(WO_4)_3$ was dropped onto an aluminum disk with 30 mm in φ (diameter) and 5 mm in thickness after the polyethylene oxide had been dissolved in ethanol in which a powder of the $Al_2(WO_4)_3$ was dispersed, thereby providing the aluminum disk's surfaces with a mixed thin film that comprised the polyethylene oxide, and the $Al_2(WO_4)_3$. The positive-electrode-side electrolytic solution 4 was a water-soluble electrolytic solution, and comprised a 2-mol/L $Al(NO_3)_3$ aqueous solution. The positive electrode 5 comprised metallic copper.

The secondary battery 7 was a coin-type battery. The secondary battery 7 was equipped with cases (61, 62), and comprised the negative electrode 1, the electrolytic solution 2 for negative electrode, the diaphragm 3, the electrolytic solution 4 for positive electrode, and the positive electrode 5 that were arranged in order inside the cases (61, 62). The cases (61, 62) were made of glass, and took on a configuration which was formed by halving a coin configuration along the axial middle. The negative electrode 1, and the electrolytic solution 2 for negative electrode were accommodated in the interior of the case 62. A porous body was impregnated with the electrolytic solution for negative electrode. The porous body was a polypropylene/polyethylene nonwoven fabric with 50 μm in thickness. The positive electrode 5, and the electrolytic solution 4 for positive electrode were accommodated in the interior of the case 61. The diaphragm 3 was disposed between the case 61 and the case 62. The peripheral rim of the diaphragm 3 was held and fixed airtightly by flanged portions that were formed on the opening peripheral rim of the cases (61, 62). Wiring, whose graphic illustration is abbreviated in the drawing, was connected to the negative electrode 1 and the positive electrode 5, respectively, so that the negative electrode 1 and the positive electrode 5 were constituted to lead electricity out to the outside.

When the secondary battery 7 was charged, copper in the surface of the positive electrode 5 comprising metallic copper dissolved (i.e., $Cu \text{ - - - } > Cu^{2+} + 2e^-$). The $Cu^{2+}$ was released into the electrolytic solution 4 for positive electrode, and then underwent ion exchanging with $Al(NO_3)_3$ included therein, thereby causing $Al^{3+}$ to generate (i.e., $3Cu^{2+} + 2Al(NO_3)_3 \text{ - - - } > 3Cu(NO_3)_2 + 2Al^{3+}$). The $Al^{3+}$ transmitted through the diaphragm 3 comprising the solid electrolyte that transmitted aluminum ions alone, and then moved to the negative-electrode-side electrolytic solution 2. Aluminum precipitated onto the surface of the negative electrode 1 (i.e., $Al^{3+} + 3e^- \text{ - - - } > Al$).

When the secondary battery 7 was discharged, aluminum on the surface of the negative electrode 1 dissolved into the negative-electrode-side electrolytic solution 2 (i.e., $Al \text{ - - - } > Al^{3+} + 3e^-$). The $Al^{3+}$ transmitted through the diaphragm 3, and then moved to the positive-electrode-side electrolytic solution 4. The $Al^{3+}$ underwent ion exchanging with $Cu(NO_3)_2$ existing in the positive-electrode-side electrolytic solution 4, thereby causing $Cu^{2+}$ to generate (i.e., $2Al^{3+} + 3Cu(NO_3)_2 \text{ - - - } > 3Cu^{2+} + 2Al(NO_3)_3$). Copper precipitated onto the surface of the positive electrode 5 (i.e., $Cu^{2+} + 2e^- \text{ - - - } > Cu$).

In the present invention, an element constituting the negative-electrode material was aluminum. As shown in above-mentioned Table 1, aluminum's oxidation-reduction potential is −1.68 V when hydrogen's oxidation-reduction potential is taken as 0, and accordingly is near to lithium metal's oxidation-reduction potential, −3.045V, relatively. Consequently, the electromotive force of the resulting battery was more enlarged. Moreover, the volume density of aluminum serving as the negative-electrode material is 2.7 g/cm³, and is accordingly larger than the volume density of lithium metal, 0.534 g/cm³. Consequently, the resultant battery capacity per unit volume became larger, so that the volumetric energy density of the resulting battery was more enlarged.

Second Embodiment

Figure 4:
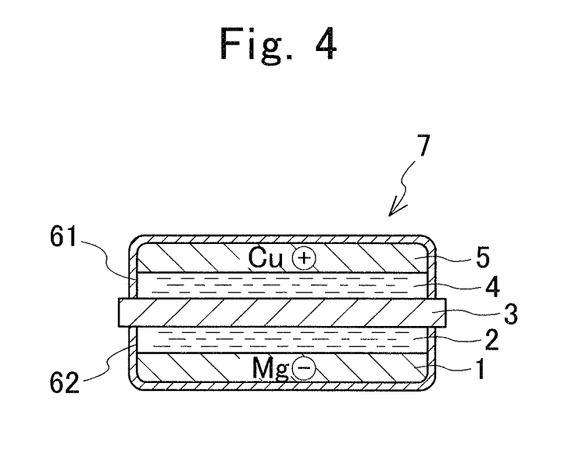
FIG. 4 is a cross-sectional explanatory diagram of a secondary battery according to a second embodiment of the present invention.

As illustrated in FIG. 4, the negative-electrode material constituting the negative electrode 1 was metallic magnesium in the secondary battery 7 according to the present embodiment.

The electrolytic solution 2 for negative electrode was made by dissolving $C_4H_9MgCl$, a Grignard reagent, into tetrahydrofuran (or THF) serving as the organic solvent. A concentration of magnesium ions in the electrolytic solution 2 was adjusted so as to be 0.25 mol/L. In the electrolytic solution 2, the Grignard reagent turned into a binuclear complex comprising a dimer in which Mg served as the cores. Since this binuclear complex exhibited charge, a high conductivity was given to the electrolytic solution.

The diaphragm 3 took on a membrane-like configuration with 0.15 mm in thickness. The diaphragm 3 was a solid electrolyte that transmitted magnesium ions alone, and a polymer-type magnesium-ion conductor was used therefor in the present embodiment. A specific construction of the polymer-type magnesium-ion conductor was as follows. Poly(ethylene glycol)dimethylether (or PEGDM) with a molecular weight about 400, which served as a polyether compound, and methoxy poly(ethylene glycol)monomethacrylate (or PEMM) and poly(ethylene glycol)dimethacrylate (or PEDM), which served as two kinds of methacryloyl-modified polyethylene oxides, were mixed one another. The mixing ratio was set at "PEGDM":"PEMM":"PEDM"=4:3:1 by mass ratio. Into this mixture, $Mg(ClO_4)_2$, an anhydride of magnesium perchloric acid, was dissolved. An Mg/EO ratio, a molar ratio of the content of the magnesium (Mg) salt with respect to the content of the alkylene-oxide units in the polyether compound (hereinafter being abbreviated to as "EO"), was set to fall in a range of from 1/32 to 1/128. In addition, to this composition, 2,2-dimethoxy-2-phenylacetophenone, which served as a photo-polymerization initiator, was added in an amount of 0.2% by weight, thereby turning the composition into a homogeneous solution. This solution was flowed to spread over an aluminum petri dish, and was then caused to undergo radical polymerization by means of irradiating the solution with ultraviolet rays using a 6-Watt ultraviolet lamp, thereby causing the composition to cure. Thus, a colorless and transparent thin film with a homogeneous composition, which had a thickness of 0.5 mm, was obtained. This thin film was the polymer-type magnesium-ion conductor.

The positive-electrode-side electrolytic solution 4 was a water-soluble electrolytic solution, and comprised a 2-mol/L $Mg(NO_3)_2$ aqueous solution. The positive electrode 5 comprised metallic copper.

When the secondary battery 7 was charged, copper in the surface of the positive electrode 5 comprising metallic copper dissolved (i.e., Cu - - - >$Cu^{2+}+2e^-$). The $Cu^{2+}$ was released into the electrolytic solution 4 for positive electrode, and then underwent ion exchanging with $Mg(NO_3)_2$ included therein, thereby causing $Mg^{2+}$ to generate (i.e., $Cu^{2+}+Mg(NO_3)_2$ - - - >$Cu(NO_3)_2+Mg^{2+}$). The $Mg^2$ transmitted through the diaphragm 3 comprising the solid electrolyte that transmitted magnesium ions alone, and then moved to the negative-electrode-side electrolytic solution 2, so that magnesium precipitated onto the surface of the negative electrode 1 (i.e., $Mg^{2+}+2e^-$ - - - >Mg).

When the secondary battery 7 was discharged, magnesium on the surface of the negative electrode 1 comprising metallic magnesium dissolved into the negative-electrode-side electrolytic solution 2 (i.e., Mg - - - >$Mg^{2+}+2e^-$). Being accompanied therewith, the $Mg^{2+}$ transmitted through the diaphragm 3, and then moved to the positive-electrode-side electrolytic solution 4. The $Mg^2$ underwent ion exchanging with $Cu(NO_3)_2$ existing in the positive-electrode-side electrolytic solution 4, thereby causing $Cu^{2+}$ to generate (i.e., $Mg^{2+}+Cu(NO_3)_2$ - - - >$Cu^{2+}+Mg(NO_3)_2$). Copper precipitated onto the surface of the positive electrode 5 (i.e., $Cu^{2+}+2e^-$ - - - >Cu).

In the present invention, an element constituting the negative-electrode material was magnesium. As shown in above-mentioned Table 1, magnesium's oxidation-reduction potential is −2.363 V when hydrogen's oxidation-reduction potential is taken as 0, and accordingly is near to lithium metal's oxidation-reduction potential, −3.045V, relatively. Consequently, the electromotive force of the resulting battery was more enlarged. Moreover, the volume density of manganese serving as the negative-electrode material is 1.783 $g/cm^3$, and is accordingly larger than the volume density of lithium metal, 0.534 $g/cm^3$. Consequently, the resultant battery capacity per unit volume became larger, so that the volumetric energy density of the resulting battery was more enlarged.

Third Embodiment

Figure 5:
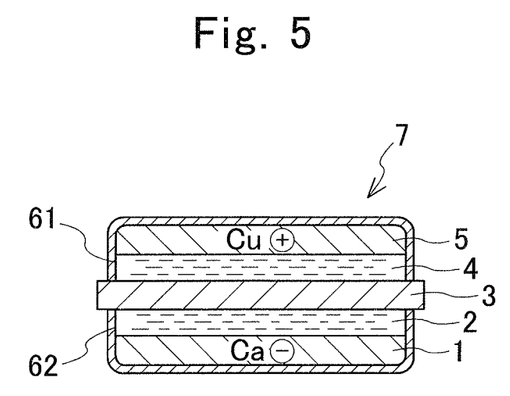
FIG. 5 is a cross-sectional explanatory diagram of a secondary battery according to a third embodiment of the present invention.

As illustrated in FIG. 5, metallic calcium was used as the negative electrode 1 in the secondary battery 7 according to the present embodiment. The electrolytic solution 2 for negative electrode was an organic electrolytic solution, and was made by dissolving $Ca(ClO_4)_2$ in an organic solvent in an amount of 1 mol/L. The organic solvent comprised propylene carbonate.

The diaphragm 3 took on a membrane-like configuration with 0.15 mm in thickness. The diaphragm 3 was a solid electrolyte that transmitted calcium ions alone, and a polymer-type calcium-ion conductor was used therefor in the present embodiment. A specific construction of the polymer-type calcium-ion conductor was a polymer electrolyte in which $Ca(ClO_4)_2$ had been put in polyethylene oxide (or PEO) in an amount of 10 parts by weight. The positive-electrode-side electrolytic solution 4 was a water-soluble electrolytic solution, and comprised a 2-mol/L $Ca(NO_3)_2$ aqueous solution. The positive electrode 5 comprised metallic copper.

When the secondary battery 7 was charged, copper in the surface of the positive electrode 5 comprising metallic copper dissolved (i.e., Cu - - - >$Cu^{2+}+2e^-$). The $Cu^{2+}$ was released into the electrolytic solution 4 for positive electrode, and then underwent ion exchanging with $Ca(NO_3)_2$ included therein, thereby causing $Ca^{2+}$ to generate (i.e., $Cu^{2+}+Ca(NO_3)_2$ - - - >$Cu(NO_3)_2+Ca^{2+}$). The $Ca^{2+}$ transmitted through the diaphragm 3 comprising the solid electrolyte that transmitted calcium ions alone, and then moved to the negative-electrode-side electrolytic solution 2. Calcium precipitated at the surface of the negative electrode 1 (i.e., $Ca^{2+}+2e^-$ - - - >Ca).

When the secondary battery 7 was discharged, calcium on the surface of the negative electrode 1 dissolved into the negative-electrode-side electrolytic solution 2 (i.e., Ca - - - >$Ca^{2+}+2e^-$). The $Ca^{2+}$ transmitted through the diaphragm 3, and then moved to the positive-electrode-side electrolytic solution 4. The $Ca^{2+}$ underwent ion exchanging with $Cu(NO_3)_2$ existing in the positive-electrode-side electrolytic solution 4, thereby causing $Cu^{2+}$ to generate (i.e., $Ca^{2+}+Cu(NO_3)_2$ - - - >$Cu^{2+}+Ca(NO_3)_2$). Copper precipitated onto the surface of the positive electrode 5 (i.e., $Cu^{2+}+2e^-$ - - - >Cu).

In the present invention, an element constituting the negative-electrode material was calcium. As shown in above-mentioned Table 1, calcium's oxidation-reduction potential is −2.87 V when hydrogen's oxidation-reduction potential is taken as 0, and accordingly is near to lithium metal's oxidation-reduction potential, −3.045 V, relatively. Consequently, the electromotive force of the resulting battery was more enlarged. Moreover, the volume density of calcium serving as the negative-electrode material is 1.55 g/cm$^3$, and is accordingly larger than the volume density of lithium metal, 0.534 g/cm$^3$. Consequently, the resultant battery capacity per unit volume became larger, so that the volumetric energy density of the resulting battery was more enlarged.

Fourth Embodiment

Figure 6:
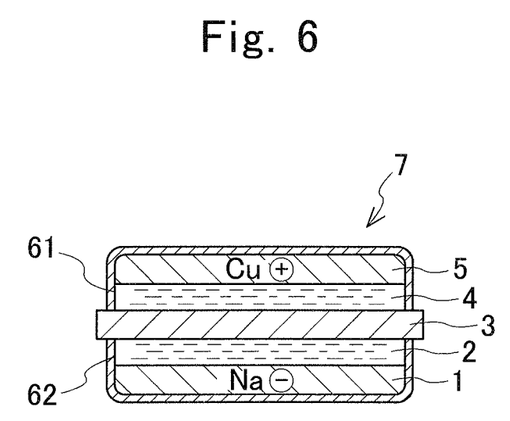
FIG. 6 is a cross-sectional explanatory diagram of a secondary battery according to a fourth embodiment of the present invention.

As illustrated in FIG. 6, metallic sodium was used as the negative electrode 1 in the secondary battery 7 according to the present embodiment. The electrolytic solution 2 for negative electrode was an organic electrolytic solution, and was made by dissolving NaClO$_4$ in an organic solvent in an amount of 1 mol/L. The organic solvent was an organic solvent in which ethylene carbonate (or EC) and diethyl carbonate (or DEC) were mixed one another in a proportion of 1:1 by volume ratio.

The diaphragm 3 took on a membrane-like configuration with 0.15 mm in thickness. The diaphragm 3 was a solid electrolyte that transmitted sodium ions alone, and "NASICON" was used therefor in the present embodiment. A specific construction of "NASICON" was Na$_4$Zr$_2$Si$_3$O$_{12}$. The positive-electrode-side electrolytic solution 4 was water-soluble electrolytic solution, and comprised a 2-mol/L NaNO$_3$ aqueous solution. The positive electrode 5 comprised metallic copper.

When the secondary battery 7 was charged, copper in the surface of the positive electrode 5 comprising metallic copper dissolved (i.e., Cu - - - >Cu$^{2+}$+2e$^-$). The Cu$^{2+}$ was released into the electrolytic solution 4 for positive electrode, and then underwent ion exchanging with NaNO$_3$ included therein, thereby causing Na$^+$ to generate (i.e., Cu$^{2+}$+2NaNO$_3$ - - - >Cu(NO$_3$)$_2$+2Na$^+$). The Na$^+$ transmitted through the diaphragm 3 comprising the solid electrolyte that transmitted sodium ions alone, and then moved to the negative-electrode-side electrolytic solution 2. Sodium precipitated onto the surface of the negative electrode 1 (i.e., Na$^+$+e$^-$ - - - >Na).

When the secondary battery 7 was discharged, sodium on the surface of the negative electrode 1 dissolved into the negative-electrode-side electrolytic solution 2 (i.e., Na - - - >Na$^+$+e$^-$). The Na$^+$ transmitted through the diaphragm 3, and then moved to the positive-electrode-side electrolytic solution 4. The Na$^+$ underwent ion exchanging with Cu(NO$_3$)$_2$ existing in the positive-electrode-side electrolytic solution 4, thereby causing Cu$^{2+}$ to generate (i.e., 2Na$^+$+Cu(NO$_3$)$_2$ - - - >Cu$^{2+}$+2NaNO$_3$). Copper precipitated onto the surface of the positive electrode 5 (i.e., Cu$^{2+}$+2e$^-$ - - - >Cu).

In the present invention, an element constituting the negative-electrode material was sodium. As shown in above-mentioned Table 1, sodium's oxidation-reduction potential is −2.714 V when hydrogen's oxidation-reduction potential is taken as 0, and accordingly is near to lithium metal's oxidation-reduction potential, −3.045V, relatively. Consequently, the electromotive force of the resulting battery was more enlarged. Moreover, the volume density of sodium serving as the negative-elect rode material is 0.968 g/cm$^3$, and is accordingly larger than the volume density of lithium metal, 0.534 g/cm$^3$. Consequently, the resultant battery capacity per unit volume became large, so that the volumetric energy density of the resulting battery was more enlarged.

EXPLANATION ON REFERENCE NUMERALS

1: Negative Electrode;
2: Negative-electrode-side Electrolytic Solution;
3: Diaphragm;
4: Positive-electrode-side Electrolytic Solution;
5: Positive Electrode;
(61, 62): Cases; and
7: Secondary Battery

The invention claimed is:

1. A secondary battery comprising a negative electrode, an electrolytic solution for negative electrode, a diaphragm, an electrolytic solution for positive electrode, and a positive electrode, which are disposed in order, characterized in that
said negative electrode comprises a negative-electrode material which has a metallic element and a volume density of said material is larger than that of lithium metal,
said positive electrode comprises a positive-electrode material which comprises copper, iron, silver or gold,
said metallic element comprises aluminum,
said diaphragm is a solid electrolyte which transmits aluminum ions alone, and
said solid electrolyte comprises a mixed membrane of polyethylene oxide and Al$_2$(WO$_4$)$_3$ disposed on an aluminum disk.

2. The secondary battery as set forth in claim 1, wherein said negative-electrode material comprises a metal comprising said metallic element, or an alloy including said metallic element.

3. The secondary battery as set forth in claim 1, wherein said electrolytic solution for negative electrode is an organic electrolytic solution, or an ionic solution.

4. The secondary battery as set forth in claim 1, wherein said positive electrode comprises a positive-electrode material that has an element, wherein an oxidation-reduction potential of said element is more "noble" by 1 V or more with respect to an oxidation-reduction potential of said negative electrode.

5. The secondary battery as set forth in claim 1, wherein said electrolytic solution for negative electrode includes an ethylmethylimidazolium salt.

6. The secondary battery as set forth in claim 1, wherein said electrolytic solution for positive electrode is a water-soluble electrolytic solution.

7. The secondary battery as set forth in claim 1, wherein said positive-electrode active material is metallic copper.

8. The secondary battery as set forth in claim 1, wherein said electrolytic solution for negative electrode comprises Al(NO$_3$)$_3$.

9. The secondary battery as set forth in claim 1, further comprising a porous body, wherein said porous body is impregnated with said electrolytic solution for negative electrode.

10. The secondary battery as set forth in claim 1, wherein said electrolytic solution for positive electrode is a nitrate aqueous solution.

11. The secondary battery as set forth in claim 7, claim 1, wherein said electrolytic solution for positive electrode comprises Al(NO$_3$)$_3$.

* * * * *

UNITED STATES PATENT AND TRADEMARK OFFICE
CERTIFICATE OF CORRECTION

PATENT NO.          : 9,444,100 B2
APPLICATION NO.     : 14/373105
DATED               : September 13, 2016
INVENTOR(S)         : Junichi Niwa et al.

It is certified that error appears in the above-identified patent and that said Letters Patent is hereby corrected as shown below:

In the Claims

Column 14, Line 61 Claim 11:
Delete: "11. The secondary battery as set forth in claim 7, claim 1,"
Insert: -- 11. The secondary battery as set forth in claim 1, --

Signed and Sealed this
Twenty-seventh Day of February, 2018

Andrei Iancu
*Director of the United States Patent and Trademark Office*